(12) United States Patent
Kurth et al.

(10) Patent No.: US 8,272,649 B2
(45) Date of Patent: Sep. 25, 2012

(54) SEAL FOR STEERING KNUCKLE PIN BEARING

(75) Inventors: Jürgen Kurth, Odenthal (DE); Marcel Gersting, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 281 days.

(21) Appl. No.: 12/592,460

(22) Filed: Nov. 24, 2009

(65) Prior Publication Data
US 2010/0140895 A1 Jun. 10, 2010

(51) Int. Cl.
*B62D 7/18* (2006.01)
(52) U.S. Cl. .................................. 280/93.512
(58) Field of Classification Search ............. 280/93.512; 277/630
See application file for complete search history.

(56) References Cited

FOREIGN PATENT DOCUMENTS

| DE | 19738114 A1 | 3/1999 |
|----|-------------|--------|
| DE | 102007031321 A1 | 1/2009 |
| DE | 102008029544 A1 | 1/2009 |

*Primary Examiner* — Faye M. Fleming
(74) *Attorney, Agent, or Firm* — Mark A. Ussai; Bryan Peckjian

(57) ABSTRACT

A steering knuckle pin bearing assembly includes a bearing and a steering knuckle pin pivotably supporting a steering knuckle relative to an axle beam. A sealing collar seals a space between the bearing and the steering knuckle pin, which space may include a spacer washer. The sealing collar is slidably borne on a radial outer surface of the bearing. In addition, the sealing collar has at least one sealing region that is in slidable contact with an at least substantially cylindrical sealing surface of the axle beam.

20 Claims, 1 Drawing Sheet

SEAL FOR STEERING KNUCKLE PIN BEARING

CROSS-REFERENCE

The present application claims priority to German patent application no. 10 2008 059 454.7 filed Nov. 28, 2008, the contents of which are incorporated fully herein by reference.

TECHNICAL FIELD

The present disclosure generally concerns a seal for a steering knuckle pin bearing, which may be utilized, e.g., in motor vehicle applications.

RELATED ART

A known steering knuckle pivotably supports a steerable wheel of a motor vehicle on an axle beam of the vehicle chassis via a steering knuckle pin, which is inserted into bores in the steering knuckle and/or in the axle beam. Needle roller bearings may also radially support the steering knuckle pin relative to the axle beam. The steering knuckle pin absorbs radial forces. Axial forces are transferred via an axial roller bearing between the steering knuckle and the axle beam and/or the steering knuckle pin. The axial roller bearing may be a tapered roller bearing or a cylindrical roller bearing that is mounted on the steering knuckle pin.

One or more spacer- and/or shim washers can be disposed between the axle beam and the axial roller bearing. The thickness of the washer(s) is selected so that the clearance of the axle beam relative to the steering knuckle in the axial direction does not exceed a predetermined maximum amount. In order to avoid corrosion, a gap or space between the axle beam and the axial roller bearing is sealed, in which gap the spacer washer is disposed. Any sealing assembly utilized in this location is preferably designed to be removed and re-installed in a simple manner so that, e.g., the spacer washer can be easily replaced when necessary.

Consequently, there is a long-felt need in the art to provide a good-sealing, easily-installable sealing collar for sealing a steering knuckle pin bearing.

SUMMARY

In one aspect of the present teachings, a steering knuckle pin bearing assembly includes a steering knuckle pin for pivotably bearing a steering knuckle in an axle beam. A sealing collar preferably seals a space or gap between a bearing and the steering knuckle pin. The sealing collar is preferably slidably borne or supported on a radial outer surface of the bearing.

In a further aspect of the present teachings, the sealing collar preferably has at least one sealing region that is slidable onto an at least substantially cylindrical sealing surface of the axle beam. The gap between the bearing, which may be embodied, e.g., as an axial roller bearing, and the steering knuckle pin and/or the gap between the axial roller bearing and the axle beam can be reliably sealed thereby. By utilizing such a sealing collar, the installation and removal of the seal, and thus a spacer/shim washer protected thereby, can be achieved in a simple manner. For example, in comparison to known sealing assemblies having labyrinth seals, a better sealing capability and a lower sensitivity to axial tolerances of the components can be achieved.

As utilized herein, a "cylindrical sealing surface" includes, among others, substantially cylindrical surfaces that differ from a perfect cylindrical shape by the inclusion of structures such as one or more ribbings, channels and/or grooves.

In preferred embodiments, the sealing collar may comprise an elastomeric body having a sealing lip and a reinforcement sleeve made of metal. Such sealing collars provide a good seal and at the same time are also very stable.

The present teachings are applicable, e.g., to steering knuckle pin bearings for trucks, which require large axial roller bearings. However, the skilled person will recognize that the present teachings are applicable to a variety of fields, in which a rotating shaft and/or bearing requires a reliable seal or outer covering.

In another preferred embodiment, the reinforcement sleeve of the sealing collar may include a radially-extending flange on an end that faces and/or contacts the axle beam. The flange preferably abuts on a radially-extending step of the axle beam in the pushed-on or installed position of the sealing collar. The radially-extending step enables the sealing position of the sealing collar to be reliably fixed or set and/or reliably prevents the sealing collar from being pushed too far onto the axle beam during the installation thereof.

If the cylindrical sealing surface of the axle beam has a larger diameter than the radial outer surface of the bearing and/or the sealing collar extends in a stepped, tapered and/or bulged manner, a sufficient space for the radial clearance of a spacer or shim washer can be made possible.

In other embodiments, a good seal of the sealing collar on the outer surface of the bearing may be achieved by providing a plurality of sealing lips in different axial positions along the portion of the sealing collar that abuts on the radial outer surface. The sealing lips can be embodied, e.g., as elevations of a corrugated structure.

In another aspect of the present teachings, the sealing surface on the axle beam preferably includes at least one at least partially circumferentially-extending groove. In this embodiment, the sealing collar also preferably includes an at least partially circumferentially-extending bead configured to engage in the groove in the pushed-on or installed position of the sealing collar on the axle beam. The sealing properties of the sealing collar can be improved thereby and, at the same time, a latching of the sealing collar in its intended installation position can be achieved by a snap-fit of the bead in the groove.

The sealing properties and the retention of the sealing collar on the sealing surface can be further improved, e.g., by providing a ribbed structure on at least one section of the sealing surface.

In another aspect of the present teachings, the bearing is preferably an axial roller bearing and the outer shell of the axial roller bearing is preferably formed from a metal sleeve that captively retains the two races of the axial roller bearing prior to the installation. The axial roller bearing having the metal sleeve can, together with the sealing collar, form a pre-assembled subcomponent.

A sufficient radial clearance for the shim washer can be achieved, e.g., if the sealing collar includes a smaller diameter first region abutting on the outer surface of the axial roller bearing and a second region having a larger diameter abutting on the axle beam. The second region preferably axially overlaps with the shim washer, which is disposed between the side of the axial roller bearing and the side of the axle beam that face each other in the axial direction of the steering knuckle pin.

Further advantages, objects and features of the present teachings will be readily derivable by a skilled person from the following description of the figures and from the appended claims.

DETAILED DESCRIPTION OF THE PREFERRED EMBODIMENTS

Each of the additional features and teachings disclosed below may be utilized separately or in conjunction with other features and teachings to provide improved seals and/or bearing assemblies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
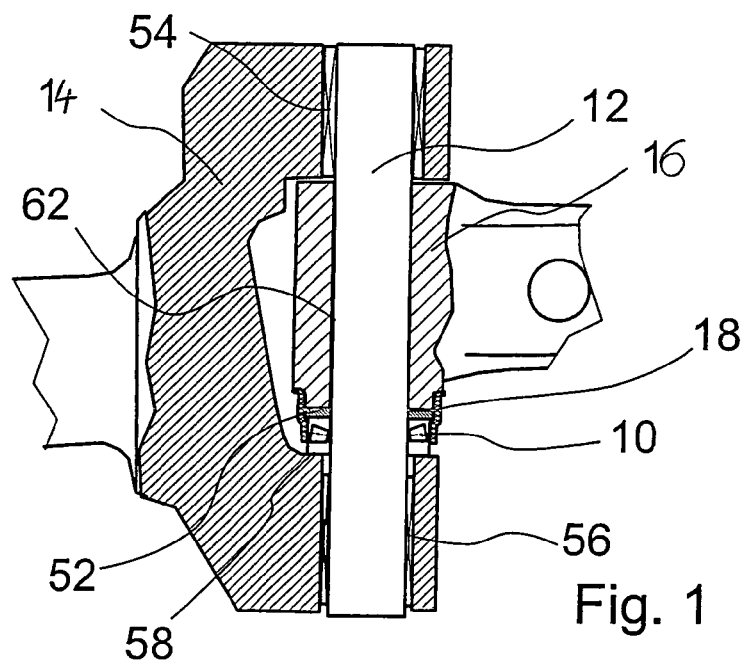
FIG. 1 shows a schematic illustration of a steering knuckle pin bearing having a steering knuckle pin, a steering knuckle and an axle beam.

FIG. 1 schematically shows a wheel suspension for a steerable front wheel of a motor vehicle. A steering knuckle 14 is pivotably borne relative to an axle beam 16. The steering knuckle 14 and the axle beam 16 are pivotably connected with each other via a steering knuckle pin 12. The steering knuckle pin 12 is rotatably borne or supported in the steering knuckle 14 via a bearing 54 and, if necessary, an additional bearing 56, which bearings may be, e.g., needle roller bearings.

The axle beam 16 is axially supported on a radially-extending step 58 of the steering knuckle 14 via an axial roller bearing 10. A spacer or shim washer 52 is disposed between the axial roller bearing 10, which is preferably a tapered roller bearing, and a facing side 48 (FIG. 2) of the axle beam. The shim washer 52 limits the axial clearance of the axle beam 16 relative to the steering knuckle 14 to a minimum.

A sealing collar 18 seals or covers a space between the axial roller bearing 10 and the axle beam 16. The shim washer 52 is also disposed in this space.

Figure 2:
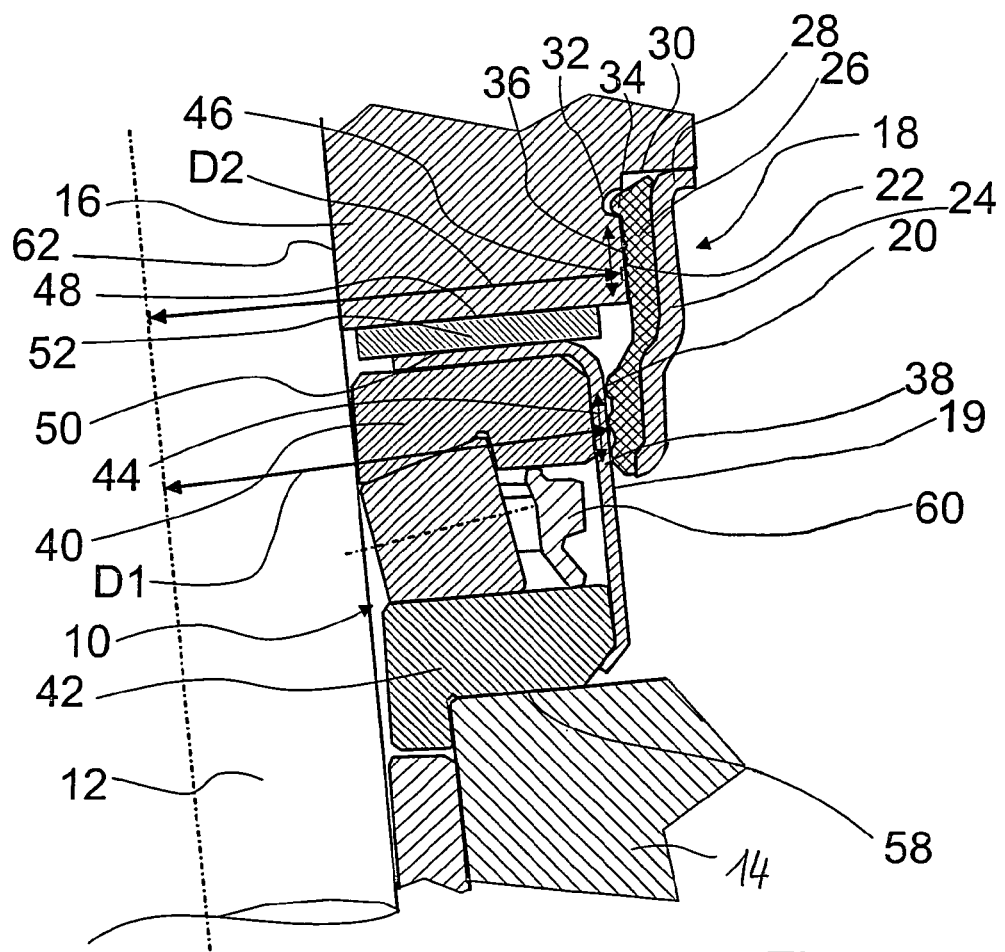
FIG. 2 shows a cut-out section from FIG. 1 with a detailed illustration of an axial roller bearing and a sealing collar.

FIG. 2 shows a cut-out section from FIG. 1 with the axial roller bearing 10 and the sealing collar 18 in a more detailed view.

The axial roller bearing 10 preferably comprises an upper race 40 and a lower race 42, each of which includes a track, in which tapered roller bodies of the axial roller bearing 10 move. A metal sleeve 38 captively retains the two races 40, 42, so that the axial roller bearing 10 may preferably form a pre-assembled subcomponent. The roller bodies are guided in a bearing cage 60. The lower race 42 abuts on the radially-extending step 58 of the bore of the steering knuckle 14. The metal sleeve 38 encompasses the axially-facing side of the upper race 40. The shim washer 52 abuts on a radially-extending portion of the metal sleeve 38. When an axial force is transferred via the axial roller bearing 10, the axially facing side 48 of the axle beam 16 is braced on the shim washer 52.

Three sealing lips 20 of the sealing collar 18, which together form a wave-shaped or undulating inner side of a first region 44 of the sealing collar 18, abut on the radial outer surface 19 of the axial roller bearing 10. Less or more than three sealing lips 20 may be utilized in alternate embodiments. The radial outer surface 19 of the axial roller bearing 10 is the radial outer surface of the metal sleeve 38.

The sealing collar 18 preferably comprises an elastomeric body 26 and a metallic reinforcement sleeve 24, which may be, e.g., a deep-drawn metal plate part. The entire sealing collar 18 may have a material thickness, e.g., of about 1.5 mm, which may be divided approximately into equal halves between the elastomeric body 26 and the reinforcement sleeve 24, although other thickness are naturally within the scope of the present teachings. The reinforcement sleeve 24 can form an outer sheathing of the sealing sleeve 18. The elastomeric body 26 can be vulcanized on the reinforcement sleeve 24, pressed into the reinforcement sleeve 24 or adhered thereto.

The reinforcement sleeve 24 preferably includes a radially-extending flange 28 on an end facing the axle beam 16. The axial end face of the flange 28 is preferably free from elastomeric material. In the fully pushed-on (i.e. installed) position of the sealing collar 18 illustrated in FIG. 2, the top face of the flange 28 abuts on a radially-extending step 30 of the axle beam 16.

The sealing collar 18 has, in a second region 46, an inner diameter D2 that is larger than the inner diameter D1 in the first region 44. Thus, the sealing collar 18 enlarges in the radial direction between the regions 44, 46, e.g., in a ramp-like, tapered, bulged or step-like manner. In the sealing configuration illustrated in FIG. 2, the radial enlargement ends at the height of the axially facing side of the axial roller bearing 10, so that the other diameter D2 creates a radial clearance for the shim washer 52.

The steering knuckle pin 12 is inserted into a bore 62 of the axle beam 16. A substantially cylinder-shaped outer sealing surface 22 is formed on the axle beam 16 concentric to the bore. The sealing surface 22 intended for facing and/or contacting the upper surface of the elastomeric body 26 is formed with a corrugation or other undulating structure 36.

In addition or in the alternative, the sealing surface 22 preferably comprise a relatively deep groove 32 in a region adjacent to the step 30. In the sealing position of the sealing collar 18 illustrated in FIG. 2, a bead 34 of the elastomeric body 26 of the sealing collar 18 engages in the groove 32. The bead 34 and the groove 32 preferably form a snap-fit connection between the sealing collar 18 and the sealing surface 22 in the sealing configuration.

In certain embodiments, the sealing collar 18 and the axial roller bearing 10 may form a pre-assembled subcomponent.

In order to install or replace the axial roller bearing 10 and/or the shim washer 52, the sealing collar 18 may be axially slid in the downward direction with respect to the orientation illustrated in FIG. 2, so that the flange 28 withdraws in the axial direction below the top side 50 of the axial roller bearing 10. After inserting the axial roller bearing 10 and/or shim washer 52, the sealing collar 18 is pushed/slid upwardly over the sealing surface 22, wherein the axial roller bearing 10 remains retained on the axle beam 16 in a captive manner, thereby simplifying the installation.

| REFERENCE NUMBER LIST | |
|---|---|
| 10 | Axial roller bearing |
| 12 | Steering knuckle pin |
| 14 | Steering knuckle |
| 16 | Axle beam |
| 18 | Sealing collar |
| 19 | Outer surface |
| 20 | Sealing lip |
| 22 | Sealing surface |
| 24 | Reinforcement sleeve |
| 26 | Elastomeric body |
| 28 | Flange |
| 30 | Step |
| 32 | Groove |
| 34 | Bead |
| 36 | Corrugation |
| 38 | Sleeve |
| 40 | Race |
| 42 | Race |
| 44 | Region |
| 46 | Region |
| 48 | Facing side |
| 50 | Facing side |
| 52 | Spacer/shim washer |
| 54 | Bearing |
| 56 | Bearing |
| 58 | Step |
| 60 | Bearing cage |
| 62 | Bore |
| D1 | Diameter |
| D2 | Diameter |

The invention claimed is:

1. A seal of a steering knuckle pin bearing comprising:
   a steering knuckle pin configured to pivotably bear a steering knuckle relative to an axle beam,
   a bearing disposed about the steering knuckle pin, and
   a sealing collar configured to seal a space between the bearing and the axle beam, wherein the sealing collar is slidably borne on a radial outer surface of the bearing and includes at least one sealing region that is slidable onto an at least substantially cylindrical sealing surface of the axle beam.

2. The seal according to claim 1, wherein the sealing collar comprises an elastomeric body that includes the sealing region and a reinforcement sleeve.

3. The seal according to claim 2, wherein the reinforcement sleeve includes a radially-extending flange disposed on an end facing the axle beam, the flange abutting on a radially-extending step of the axle beam.

4. The seal according to claim 1, wherein the sealing surface of the axle beam has a larger diameter than the radial outer surface of the bearing.

5. The seal according to claim 1, wherein the sealing collar includes a plurality of sealing lips in different axial positions in a portion of the sealing collar that abuts on the radial outer surface of the bearing.

6. The seal according to claim 1, wherein the sealing surface of the axle beam includes at least one at least partially circumferentially-extending groove and the sealing collar includes an at least partially circumferentially-extending bead that is engaged in the circumferentially-extending groove.

7. The seal according to claim 1, wherein at least a portion of the sealing surface of the axle beam comprises a corrugated profile.

8. The seal according to claim 1, wherein the outer surface of the bearing comprises a metal sleeve that captively retains two races of the bearing.

9. The seal according to claim 1, wherein the bearing and the sealing collar form a pre-assembled subcomponent.

10. The seal according to claim 1, wherein the sealing collar includes a first region, which abuts on the outer surface of the bearing, and a second region having a larger diameter than the first region, wherein the second region covers a shim washer disposed between a side of the bearing and a side of the axle beam that face each other in the axial direction.

11. The seal according to claim 1, wherein the bearing is an axial roller bearing disposed between the steering knuckle and the axle beam.

12. The seal according to claim 11, wherein:
    the sealing collar comprises an elastomeric body and a reinforcement sleeve, the reinforcement sleeve including a radially-extending flange abutting on a radially-extending step of the axle beam,
    the sealing collar includes a first region, which abuts on the outer surface of the axial roller bearing, and a second region having a larger diameter than the first region, wherein the second region covers a spacer washer disposed about the steering knuckle pin between the axial roller bearing and the axle beam,
    the sealing collar includes a plurality of sealing lips in different axial positions in the first region of the sealing collar that abuts on the outer surface of the axial roller bearing,
    the sealing surface of the axle beam includes at least one at least partially circumferentially-extending groove, the sealing collar including an at least partially circumferentially-extending bead that is engaged in the circumferentially-extending groove,
    at least a portion of the sealing surface of the axle beam comprises a corrugated profile, and
    the outer surface of the axial roller bearing comprises a metal sleeve that captively retains two races of the axial roller bearing.

13. A steering knuckle pin bearing assembly comprising:
    a steering knuckle pin pivotably supporting a steering knuckle relative to an axle beam,
    a bearing disposed about the steering knuckle pin between the steering knuckle and the axle beam, and
    a sealing collar sealing a space between the bearing and the axle beam, wherein the sealing collar is slidably borne on a radial outer surface of the bearing and includes at least one sealing region in slidable contact with an at least substantially cylindrical sealing surface of the axle beam.

14. The knuckle pin bearing assembly according to claim 13, wherein the sealing collar comprises an elastomeric body and a reinforcement sleeve, the reinforcement sleeve including a radially-extending flange abutting on a radially-extending step of the axle beam.

15. The knuckle pin bearing assembly according to claim 14, wherein the bearing comprises an axial roller bearing and a spacer washer is disposed in the space between the axial roller bearing and the axle beam.

16. The knuckle pin bearing assembly according to claim 15, wherein the sealing surface of the axle beam includes at least one at least partially circumferentially-extending groove and the sealing collar includes an at least partially circumferentially-extending bead that is engaged in the circumferentially-extending groove.

17. The knuckle pin bearing assembly according to claim 16, wherein the outer surface of the axial roller bearing comprises a metal sleeve that captively retains two races of the axial roller bearing.

18. The knuckle pin bearing assembly according to claim 15, wherein the sealing collar includes a first region, which abuts on the outer surface of the axial roller bearing, and a second region having a larger diameter than the first region, wherein the second region covers the spacer washer.

19. The knuckle pin bearing assembly according to claim 18, wherein the sealing collar includes a plurality of sealing lips in different axial positions in the first region and wherein at least a portion of the sealing surface of the axle beam that faces the second region of the sealing collar comprises a corrugated profile.

20. The knuckle pin bearing assembly according to claim 13, wherein the bearing and the sealing collar form a pre-assembled subcomponent.

* * * * *